June 21, 1960  T. H. ROBERTSON  2,942,095
TEMPERATURE OPERATED POWER ELEMENT
Filed Oct. 8, 1957
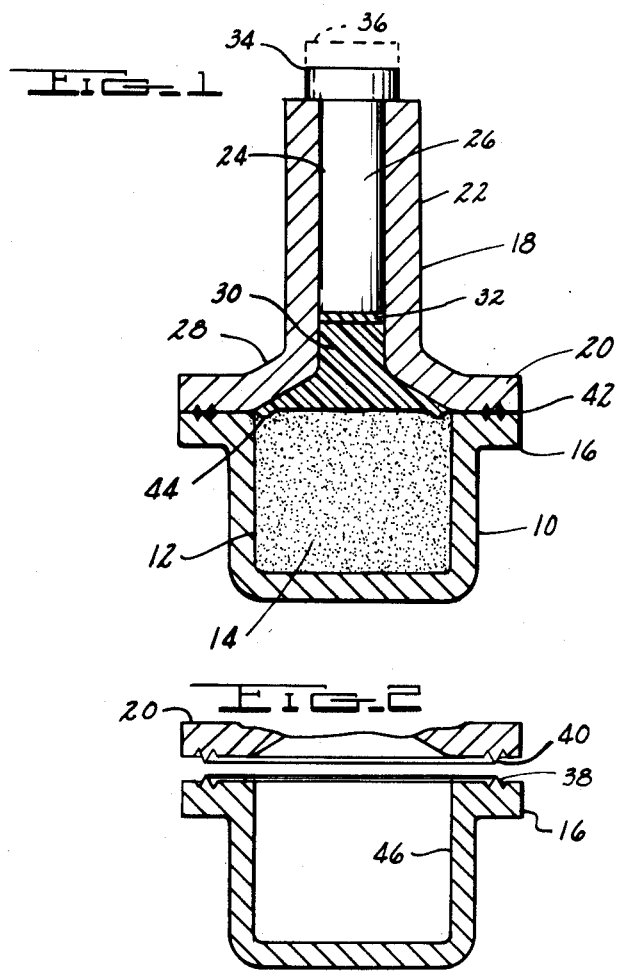
INVENTOR
THOMAS H. ROBERTSON
SMITH, OLSEN, LEWIS & M<sup>c</sup>RAE
ATTORNEYS

United States Patent Office 2,942,095
Patented June 21, 1960

2,942,095

TEMPERATURE OPERATED POWER ELEMENT

Thomas Herbert Robertson, Birmingham, Mich., assignor to American Radiator & Standard Sanitary Corporation, New York, N.Y., a corporation of Delaware Filed Oct. 8, 1957, Ser. No. 688,874

12 Claims. (Cl. 219—93)

This invention relates to power elements actuated by an increase in temperature, and more particularly to the securing in place of a flexible diaphragm between cup and guide members of such power elements.

In power elements of this type difficulties have been encountered in securing the diaphragm in place between cup and guide members in such a manner that a uniform degree of bond is secured throughout the entire circumference of the diaphragm. As the degree of heat to which temperature actuated power elements are operated increases to the range between 300° F., and 400° F., the temperature responsive element positioned in the cup member expands to a considerable degree, thereby reshaping the diaphragm member which transmits to a deformable plug positioned in a guide member, the force exerted by the temperature responsive element. The plug member must be capable of extensive deformation to change its shape in a conical portion of the guide member to actuate a piston in a cylindrical chamber of materially reduced diameter thereby multiplying the motion of the expanding temperature responsive element to actuate the device to be operated. The diaphragm being interposed between the temperature responsive member and the deformable plug is subjected to high pressures, and is flexed to a considerable degree.

Exhaustive tests of diaphragms of different shapes have confirmed the fact that diaphragms having convolutions of medium degrees between their central and peripheral sections function better than do diaphragms having either shallow or deep convolutions. In these tests the diaphragm failure resulted from radial and circumferential fractures in the convolutions of the diaphragm, it being noted that the diaphragms having medium shaped convolutions endured much longer than did the diaphragms having the other types of convolutions. It is difficult to provide a sufficiently strong connection between associated cup and guide members by rolling a flange on one of the members where the unit is subjected to high temperatures. I have found that by the use of an accurately controlled welding operation the cup and guide members can be secured together with the diaphragm interposed therebetween in an economical manner which gives good commercial results.

An object of this invention is therefore to provide an improved method of securing together cup and guide members in such a manner that a uniform bonding is achieved throughout the entire circumference of the diaphragm.

Another object of my invention resides in the provision of internesting beads formed on cooperating flanges carried by cup and guide members to securely clamp the flange of a diaphragm between the cup and guide members when the flanges are welded together.

Still a further object of my invention resides in the development of an accurately controlled welding process, wherein the pressure and welding currents applied are carefully balanced with respect to the mass and spacing of circumferentially aligned beads carried by cooperating cup and guide members in such a manner that during the welding process the beads intimately internest to securely bond the periphery of the diaphragm with the flanges of the cup and guide members.

Another object of my invention is to provide a simple and improved method of securing together cup and guide members with a diaphragm interposed therebetween which may be practiced more economically than processes heretofore used.

Yet a still further object of my invention resides in the development of an improved process for fusing cup and guide members to a diaphragm interposed therebetween in such a manner that the possibility of porosity of the diaphragm at the point of weld is minimized.

Other objects and advantages of this invention will be apparent from the following detailed description, considered in conjunction with the accompanying drawings submitted for purposes of illustration only and not intended to define the scope of the invention, reference being had for that purpose to the subjoined claims.

In the drawings wherein similar reference characters refer to similar parts throughout the several views:

Fig. 1 is an enlarged longitudinal sectional view of a temperature responsive power element embodying my invention;

Fig. 2 is a sectional view of the separated cup and guide members showing the beads or circumferentially aligned projections formed on the cooperating flanges;

Fig. 3 is an enlarged fragmentary sectional view of a portion of one of the flange members illustrating in more detail the configuration of the circumferential beads or projections.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to Fig. 1 it will be noted that a cup member 10 has a chamber 12 for the reception of a pellet charge 14 of any suitable material having a high coefficient of expansion with an increase of temperature. The cup member is provided with a radial flange 16 adapted to receive a guide member 18 having a cooperating radial flange 20 adapted to engage the flange 16 of the cup member 10. The guide member 18 is provided with an axial section 22 of reduced diameter having an internal bore 24 of relatively small diameter compared with the diameter of the chamber 12 in the cup member 10. A piston 26 is slidably mounted in the internal bore 24 to transmit motion from the power element.

The guide member 18 is provided at its lower end with a generally conical shaped section 28 interposed between its flange 20 and the section 22 of reduced diameter. A plug member 30 shaped to conform with the space between the top of the chamber 12 of the cup member 10 and the internal bore 24 of the guide member 18 is provided to transmit motion from the pellet charge 14 to the piston 26, a disk 32 being interposed between the plug 30 and the piston 26.

The plug 30 may be formed of a substance having the characteristic of changing its shape under pressure to transmit force from the expanding pellet charge 14 in the chamber 12 to the piston 26. It will be noted that the outer end of the piston 26 may be shifted from a position 34 when the device is in the cool or retracted position to an operated position 36 illustrated in dotted lines as the device heats up.

Referring now more particularly to Figs. 2 and 3 it will be noted that the flanges 16 and 20 of the cup and guide members 10 and 18 respectively are formed with beads 38 and 40 aligning circumferentially and carried by the flanges 16 and 20 respectively. As shown more clearly in Fig. 3, the angular inclination of the beads or projections 38 and their cooperating recesses extend at angles of approximately 30°. I have found that this angle of inclination gives good results, and that the periphery of the diaphragm will be securely bonded to the internesting beads 38. Careful examination of welded assemblies which have been cut reveal that a trace of the diaphragm material, approximately .001 inch thick at the center or through the thickness of the diaphragm had not become molten in the area of the weld, the remaining .004 inch of the .005 inch thick diaphragm had fused approximately .002 inch with each of the flanges of the cup and guide members 16 and 20 respectively. This intimate fusing of the peripheral edge of the diaphragm with the cup and guide member flanges insures an intimate contact throughout the circumference of the diaphragm which eliminates the possibility of porosity in the diaphragm on the inside of the weld. Examination of many such welded units indicate that consistent results have been and can readily be achieved.

After the welding operation, examination revealed that the space in the undercut is sufficiently small at the juncture of the vertical wall 46 of the cup member 10 and the surface of the diaphragm 42 that a negligible amount of the pellet charge 14 will be extruded into the undercut in the cup.

In order to permit the pellet charge material 14 to expand under the action of increase in temperature, it is necessary that the diaphragm 42 have sufficient material therein to enable it to reshape itself to conform with the contour of the expanded surface of the pellet charge 14 without coming to the end of its elasticity, whereupon it would be subjected to stretching forces which might rupture the diaphragm. The corrugations 44 extending circumferentially around the edge of the diaphragm provides this extra material necessary to permit the diaphragm to flex or reshape itself to conform with the shape of the expanded pellet material 14. I have found from experimentation that where shallower convolutions or corrugations are employed the diaphragm failed after the operation of an undesirably few cycles of operation. Conversely, I have found that diaphragms with deeper convolutions or corrugations and embodying various widths of convolutions also failed with undesirably few cycles of operation. My tests indicate that diaphragms having medium sized corrugations or convolutions 44 of the approximate magnitude as illustrated in Fig. 1 give excellent results and embody a sufficiently long life to provide a commercially desirable temperature actuated power unit.

Any suitable means may be employed for applying the welding heat, but I have found that good results are achieved when electrical induction heating means is employed to provide localized welding heating without undesirably elevating the temperature of adjacently positioned portions of the device.

While my invention has been described with particular reference to a specific embodiment it will be apparent that various changes may be made therein without departing from the spirit of my invention as defined by the following claims.

I claim:

1. The method of securing together cup and guide members of a temperature operated power element which comprises forming interfitting beads in contacting flanges of said cup and guide members, assembling said cup and guide members with a diaphragm interposed therebetween, and applying a welding current to fuse the flanges of the guide and cup members to the diaphragm without melting the diaphragm completely through.

2. The method of assembling a temperature operated power element which comprises positioning a thermally responsive pellet member in a cup member, positioning a deformable plug in a guide member, interposing between flange members carried by the cup and guide members a diaphragm to engage the thermally responsive pellet in the cup and the plug in the guide member, and applying a welding current to fuse the flanges of the cup and guide member to the diaphragm without melting the diaphragm completely through.

3. The method of securing together cup and guide members of a temperature operated power element which comprises aligning flange members having circumferential beads carried by the cup and guide members with the periphery of a diaphragm, and applying a welding current to fuse the flange of the guide member to the diaphragm and to fuse the flange of the cup member to the diaphragm without melting the diaphragm completely through.

4. The method of assembling a temperature operated power element which comprises interposing a diaphragm between a thermally responsive pellet member positioned in a cup member and a deformable plug positioned in a guide member, aligning with the periphery of the diaphragm flange members carried by the cup and guide members and having circumferentially aligned beads, and applying a welding current to fuse together the flanges of the cup and guide members to the diaphragm without melting the diaphragm completely through.

5. The method of securing together cup and guide members of a temperature operated power element which comprises interposing between flange members carried by the cup and guide members a diaphragm, and applying a welding current to fuse the flanges of the cup and guide members to the diaphragm, without fusing the diaphragm completely together.

6. The invention defined in claim 5 wherein the diaphragm has a central unfused section of approximately .001 inch thick.

7. The invention defined in claim 5 wherein approximately .002 inch thickness of the periphery of the diaphragm is fused to each of said flanges carried by the cup and guide members.

8. The method of assembling a temperature operated power element which comprises positioning a thermally responsive pellet charge in a cup member having a radially extended flange provided with a circumferential bead, positioning a plug member in a guide member provided with an angularly related conical section and having a radially extended flange provided with a circumferential bead, interposing between the flanges of said cup and guide members a diaphragm having a circumferentially extending corrugation to permit deformation of the surface of the diaphragm contacting the surfaces of the pellet charge and plug in the cup and guide members, applying heat to fuse the flanges of the cup and guide members to the diaphragm without melting the diaphragm completely together.

9. The invention defined in claim 8, wherein the angularity of the plug contacting portion of the guide member extends at an angle of approximately 30°.

10. The invention defined in claim 8, wherein the flanges of the cup and guide members are fused to the diaphragm to a depth of at least .002 inch.

11. The invention defined in claim 8, wherein a section of a least .001 inch remains unfused to the cup and guide members.

12. The invention defined in claim 8, wherein the diaphragm is provided with a circumferential corrugation substantially as shown.

References Cited in the file of this patent

UNITED STATES PATENTS

| | | |
|---|---|---|
| 1,863,073 | Smythe | June 14, 1932 |
| 2,026,122 | Creager | Dec. 31, 1935 |
| 2,835,634 | Vernet et al. | May 20, 1958 |